United States Patent

[11] 3,579,913

[72] Inventor Kinichiro Suzuki
   Tokyo, Japan
[21] Appl. No. 783,345
[22] Filed Dec. 12, 1968
[45] Patented May 25, 1971
[73] Assignee Sansei Manufacturing Co., Ltd.
   Minato-ku, Tokyo, Japan

[54] HYDROELECTRICAL CONTROL FOR A ROTARY SURFACE GRINDER
   1 Claim, 6 Drawing Figs.
[52] U.S. Cl. ............................................. 51/95
[51] Int. Cl. ............................................. B24b 7/02
[50] Field of Search............................................. 51/95, 95.1, 50, 50(H), 123

[56] References Cited
UNITED STATES PATENTS
| | | | |
|---|---|---|---|
| 1,262,540 | 4/1918 | Miller | 51/95 |
| 1,938,439 | 12/1933 | Remington | 51/51 |
| 2,867,057 | 1/1959 | Kakiuchi | 51/51 |

*Primary Examiner*—Lester M. Swingle
*Attorney*—Linton & Linton

ABSTRACT: Hydroelectrical control for a rotary surface grinder having a table driven by an electric motor for its controlled revolution and by a hydraulic system for its reciprocal movement correlated with the controlled revolution.

INVENTOR
KINICHIRO SUZUKI

HYDROELECTRICAL CONTROL FOR A ROTARY SURFACE GRINDER

The present invention relates to a controlling means for use in a rotary surface grinder as disclosed in U.S. Pat. No. 2,867,057 wherein a workpiece is mounted on a rotary table or disc, and its surface is ground by a radially reciprocating grinding wheel, and said table is rotated with a uniform linear speed irrespective of a distance from the center of the table. Such a grinder has a defect that when the reciprocating movement of the grinding wheel and rotation of the table are both operated with a hydraulic system, if a table or disc having a larger diameter is used, sometimes uneven rotation of the table results due to the thermal change of oil viscosity and followup property of the driving force during load variation affecting on a desired even rotation of the table.

A principal object of the present invention is to avoid the above-mentioned defect by providing the table with a hydraulically operated reciprocating movement and using a DC motor as the source for rotating the table, said motor being controlled by a solid-state Leonard automatic control eliminating uneven rotation of the table due to the fluctuation of oil viscosity and load on the table to obtain an excellent and high precision ground surface of a workpiece.

A preferred embodiment of the present invention will be described in connection with the accompanying drawings, wherein FIG. 1 shows a schematic side elevation of a rotary surface grinder provided with the control means in accordance with the present invention;

Figure 1:
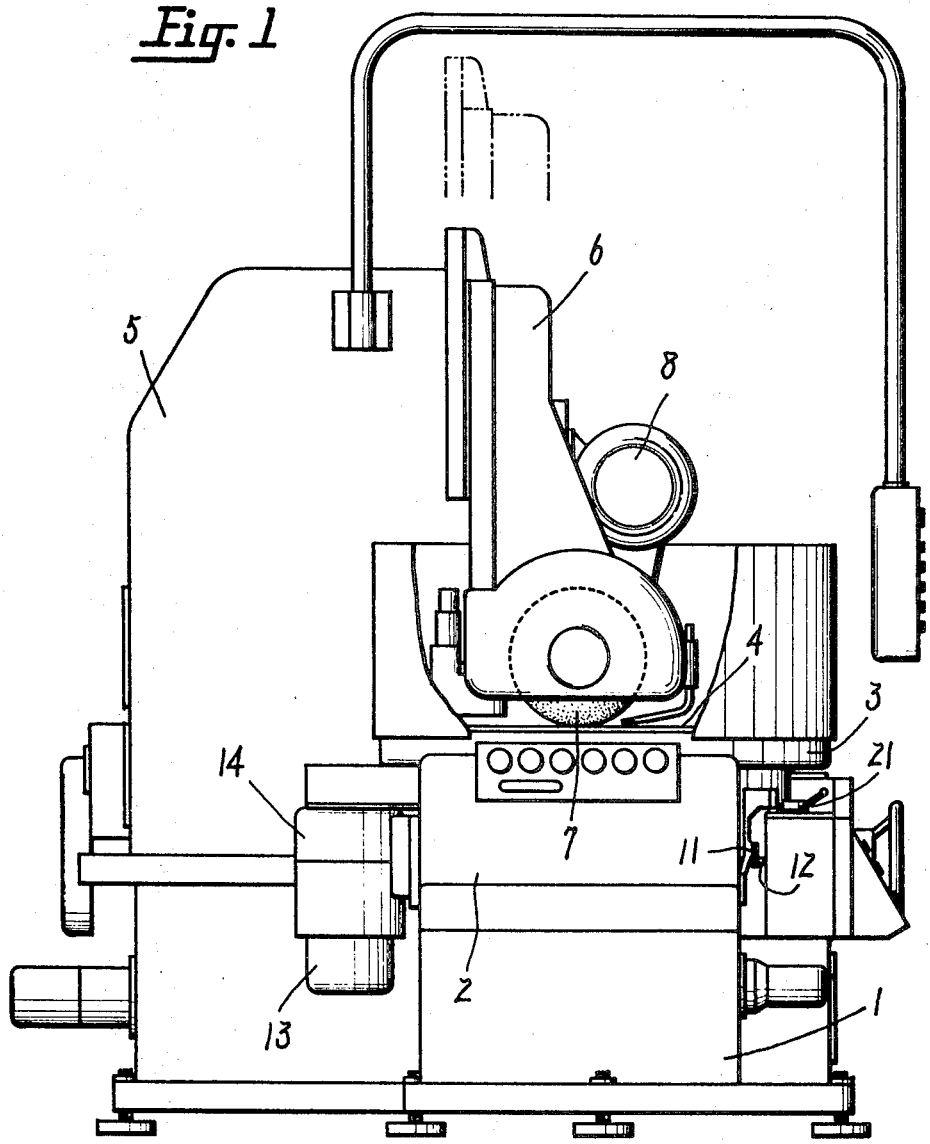
Figure 2:
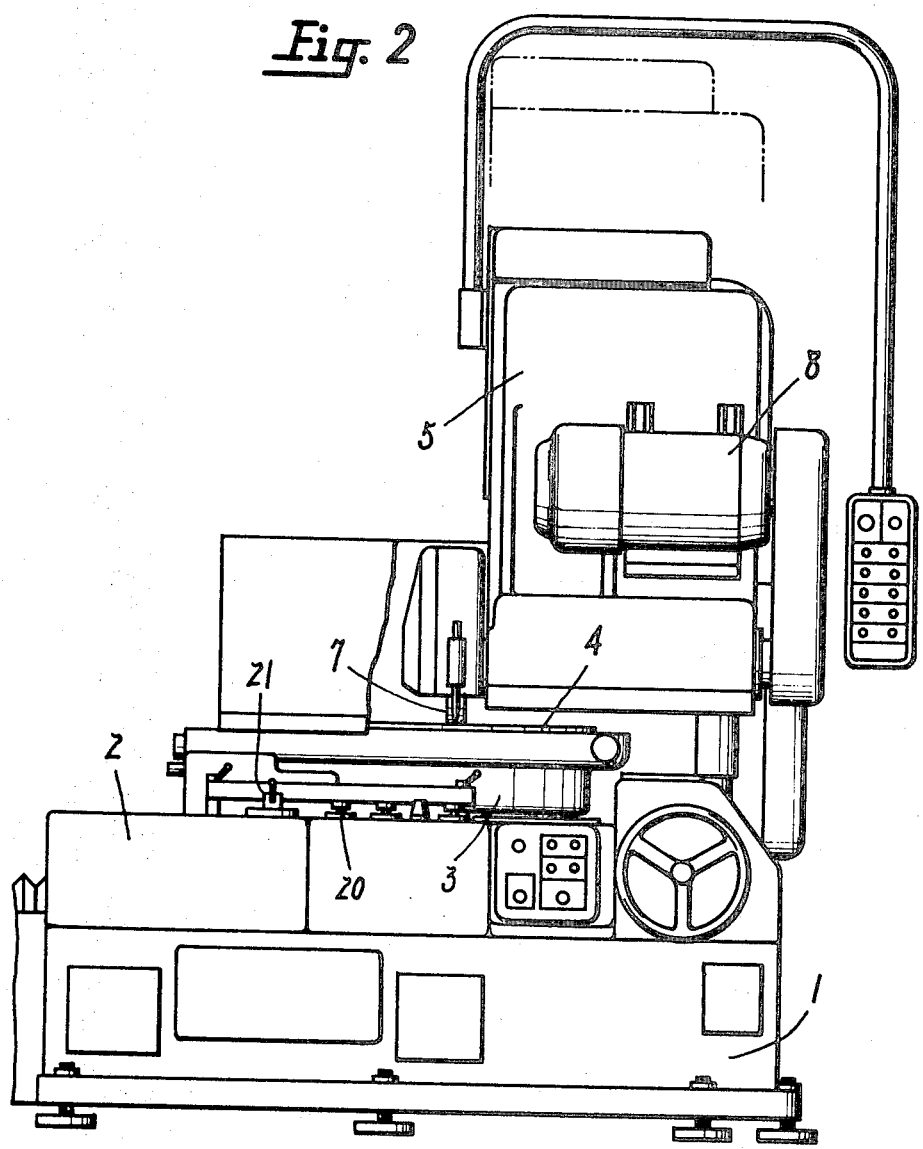
FIG. 2 is a front elevation thereof.
Figure 3:
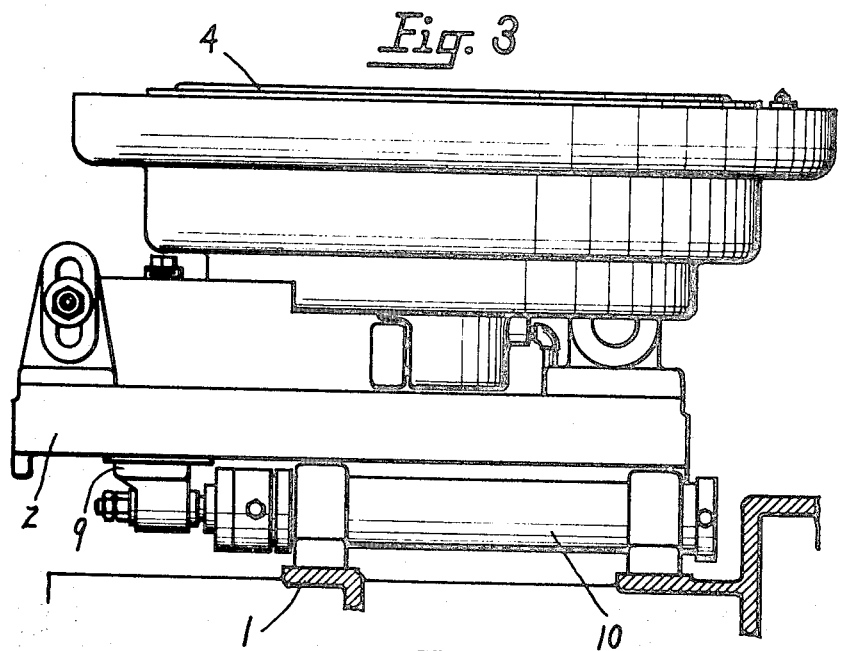
FIG. 3 shows a table of the grinder with an associated operating cylinder.

In FIGS. 1 and 2, there are shown a rotary surface grinder including the control of the present invention, which comprises a base 1, a saddle 2 slidable on said base in an engaging relation therewith, and a rotary circular table 3 on said saddle 2 having a mounting means such as an electromagnetic chuck 4. A column 5 is fixed on one side of the base 1, and a supporting frame 6 for a grinding wheel 7 is mounted on said column in a slidable engagement therewith. The grinding wheel 7 supported on the frame 6 is driven by an electric motor 8 through a pulley and a belt. A cylinder bracket 9 is fixed underside the saddle 2, and the base 1 supports a cylinder 10 as shown in FIG. 3. The piston rod of the cylinder is connected to the saddle 2 to reciprocate the same, and an oblique cam 11 attached on one end of the saddle 2 is engaging with a rack rod 12. Therefore, the longitudinal movement of the saddle guides the rack rod 12 into a lateral movement. In other words, the back and forth movement of the saddle 2 (FIG. 1) will produce a lateral movement (right and left in FIG. 1) of the rack rod 12 in a reduced ration, say 3 to 1, through the oblique contact.

The circular table 3 is driven by a DC motor 13 through a gearing 14, a pulley and a V-belt as shown in FIG. 1.

Figure 4:
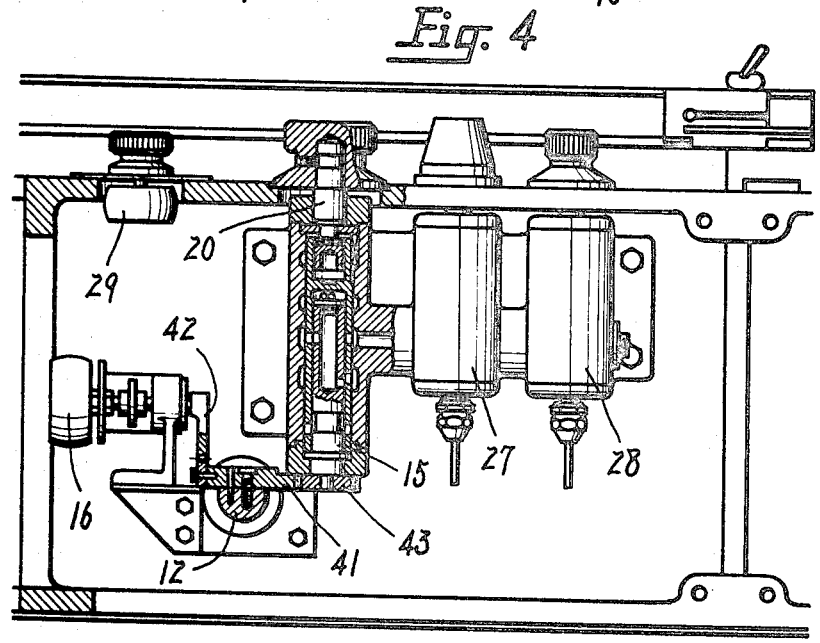
FIG. 4 is a section of a hydraulic valve for reciprocating the table.

Referring to FIG. 4, the rack rod 12 is provided with a rack 41, and the rack teeth of one side of said rack mesh with a pinion 43 of an automatic flow control valve 15 controlling the oil feed to the cylinder 10, and on the opposite side of the rack there is fixed a sector gear or rack plate 42 which drives a rotor of a rheostat 16 (also see FIG. 6) controlling the electric current to the motor 13 which rotates the rotary table 3.

Figure 5:
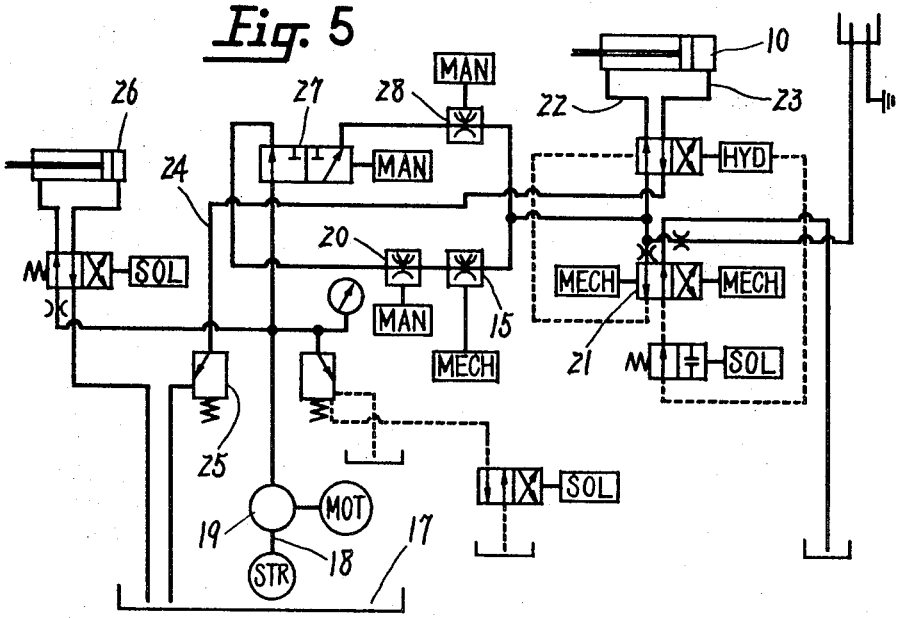
FIG. 5 is a symbolic diagram of the hydraulic system of the invention.

The oil feed to the cylinder 10 which drives the saddle 2 is controlled by a flow circuit as shown in FIG. 5. An oil reservoir 17 provided in the base 1 opens to a pipe line 18 connected to the automatic flow control valve 15 through a pump 19 and a speed control valve 20, and further connected to a switching valve 21. The said valve 21 is provided with pipe lines 22 and 23 alternately supplying the operative fluid to the cylinder 10, and a return pipe 24 opening to the reservoir 17.

The reference numeral 25 denotes a pressure control valve, provided between the return pipe 24 and the reservoir, and reference numeral 26 indicates an automatic grinding depth control cylinder, 27 a switching valve and 28 a throttle valve for a constant feed to the cylinder 10.

Figure 6:
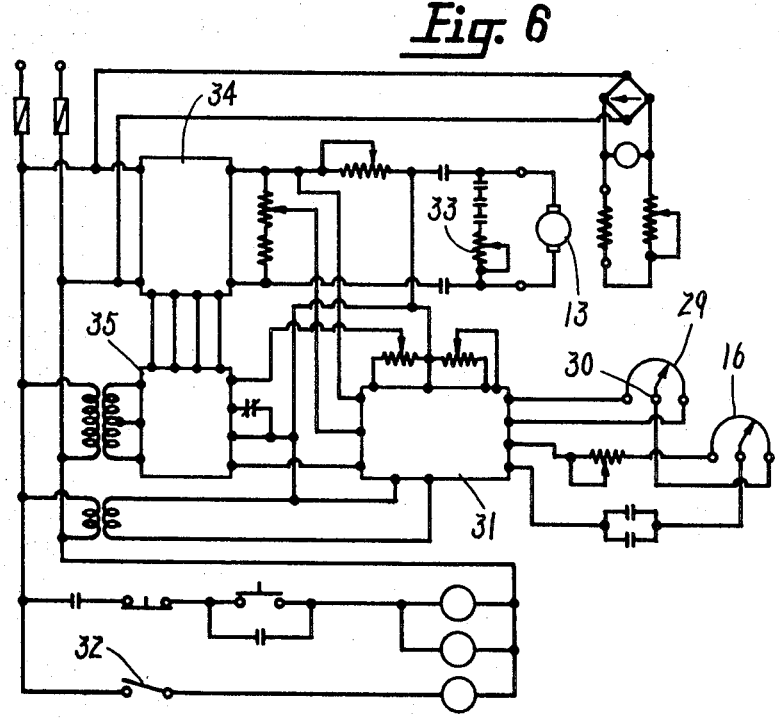
FIG. 6 is an electric circuit diagram of the automatic control of the present invention.

The speed of the motor 13 is controlled by an electrical circuit as shown in FIG. 6 wherein an output of a rheostat 29 determining the fundamental speed of the motor is connected to a terminal of a rheostat 16 operable by the reciprocal movement of the saddle 2. The output from the rheostat 29 added to the output according to the angular position of the rotor of the rheostat 16 is applied to a VI detector circuit 31 in a solid-state Leonard automatic control, from which a desired value of an electric voltage and current is supplied to the motor 13 by the variation of the gain of the VI detector circuit 31 providing the fundamental revolutional speed plus a varying speed with a ratio fixed in accordance with the movement of the saddle 2. VI detector circuit is a means for detecting load current and load voltage on a DC motor relative to a reference voltage of a control device and for automatically correcting the load.

When after a workpiece to the electromagnetic chuck 4 on the table 3, the grinding wheel 7 and pump 19 are rotated, the oil sucked by the pump passes to the switching valve 21 through the speed control valve 20 and the automatic flow control valve 15. With one position of the valve 21 the oil is fed to one side of the cylinder 10 producing a forward movement of the saddle 2, and with another position of the valve 21 the oil is fed to he opposite side of the cylinder 10 producing a backward movement of the saddle 2, thus reciprocating the saddle 2 with a desired stroke. When an alternating electric current is applied to the solid-state Leonard automatic control by a starting switch of the table 3, the DC motor 13 is rotated with a speed determined by the rheostat 29 which in turn rotates the table 3 while the work piece is ground by the grinding wheel 7. At each grinding stroke of the wheel 7, a pawl (not shown) attached to the piston rod of the hydraulic cylinder rotates a ratchet wheel (not shown) in the grinding head which lowers the grinding wheel 7 by a predetermined depth of grinding.

The rack rod 12 simultaneously operating the automatic flow control valve 15 and the rheostat 16 is moved by the plate cam 11 attached to the saddle 2 in both directions, and specifically when the saddle 2 operates the switching valve 21 by the contact of a dog fixed to the saddle, and in turn the oil is fed to one side of the cylinder 10 extending the piston, the rack rod 12 engaging with the oblique groove formed underside of the cam 11 is moved in the lateral direction to the cam, thus rotating the rheostat 16 and increasing the oil feed, speeding up the saddle movement, and at the same time controlling the electric voltage and current to the motor 13 with the result of increasing tee rotating speed of the table 3. Upon the contact of the dog with the switching valve 21 causing the return stroke of the saddle, the cam 11 guides the rack rod 12 in the reverse direction actuating the rheostat 16 and automatic flow control valve 15 in the opposite direction to the forward stroke, thus decreasing the saddle speed and the rotational speed of the table 3. The switching valve 21 and a limit switch 32 are so associated with each other that when the saddle 2 switches the switching valve 21 into a reverse position the contacts of the limit switch 32 are closed and an electric current is supplied to the DC motor and an electrical resistance 33 connected in parallel with the motor. However, when the DC current is applied to the motor 13 to decrease the rotating speed of the table 3, it can not be decreased due to the inertia effect of the table and the electromagnetic chuck 4. The surplus energy generated in the table 3 and the chuck 4 is consumed in the fixed resistance 33 and in an automatic braking of the motor 13.

If the automatic braking condition can not be obtained by the resistance 33, for the purpose of absorption of the total surplus energy produced in the table 3 and the chuck 4 in the DC motor 13, it is necessary to use a larger DC motor and its control. The reference numeral 34 denote a thyristor stack, and 35 denotes a firing circuit. Thyristor stack is a means comprising a plurality of silicon-controlled rectifying elements mounted on a heat-radiating plate in a form of a stack to effect a full wave rectification through an external control.

As mentioned as above, in the subject invention, the reciprocal movement of the saddle 2 with respect to the grinding wheel 7 is correlated with the revolutional speed of the table 3 having a work piece thereon through not only a hydraulic circuit but also an electrical circuit controlling the feed current to an electric motor. Accordingly, any portion of the surface of a workpiece may be ground evenly avoiding the errors due to the temperature change of the pressure oil and load change, resulting in a fine and accurate finishing and minimum abrasion of the grinding material. Furthermore, the mechanism in which the speed change in the hydraulic reciprocation and correlated revolutional change in a DC motor are combined with an automatic flow control valve and rotary variable electric resistances or rheostats, is applicable to other systems having the similar operation utilizing an oil system and a DC motor driving means as mentioned in the above for the purpose of a surface grinder control.

I claim:

1. In a rotary surface grinder having a slideable saddle, a rotary table supported on said saddle, an electromagnetic chuck for holding a workpiece and mounted on said rotary table and a rotatably driven grinding wheel moveably supported for vertical movement above said rotary table, a hydroelectrical control comprising an automatic electric control system including a source of current, a DC motor connected to said source of current and operatively connected to said rotary table for rotating the same, a fixed electrical resistance connected in parallel to said DC motor, a solid-state Leonard automatic control connected to said DC motor, a pair of rheostats connected to said Leonard automatic control with one of said rheostats capable of giving a variable constant speed to said DC motor, the other of said rheostats being connected to said first one of said rheostats and capable of being varied to control the speed of said DC motor, means operatively connecting said saddle to said rheostats, and a hydraulic system for automatically reciprocating said saddle and including a hydraulic cylinder operatively connected to said saddle and capable of reciprocating said saddle, a source of media under pressure, an automatic control valve connected to said media and said cylinder and means operatively connecting said saddle to said automatic control valve for regulating the flow of media to said cylinder whereby the speed of rotation of said rotary table can be correlated with the reciprocal movement of said saddle so than an even linear speed of rotation of said table may be obtained from the center of said table to its periphery for producing a uniform grinding of the workpiece.